United States Patent [19]

Cerdan et al.

[11] Patent Number: 4,650,578
[45] Date of Patent: Mar. 17, 1987

[54] CENTRIFUGING MIXTURE SEPARATOR

[75] Inventors: Jean-Pierre Cerdan, Verneuil; Eric Dueymes, Chatou; Patrick Talleu, Houilles; Jean Carnel, Fleurbaix; Gérard Palacio, Deuil la Barre; Marc Franzolini, Gif sur Yvette, all of France

[73] Assignees: Stein Industrie, Velizy-Villacoublay; Electricite de France, Paris, both of France

[21] Appl. No.: 736,999

[22] Filed: May 23, 1985

[30] Foreign Application Priority Data

May 23, 1984 [FR] France .................. 84 08085
Jan. 24, 1985 [FR] France .................. 84 01015

[51] Int. Cl.⁴ ............................................ B01D 43/00
[52] U.S. Cl. ................................. 210/197; 55/338; 55/470; 210/512.3
[58] Field of Search ........... 55/338, 467, 470–473; 210/194, 197, 512.3

[56] References Cited

U.S. PATENT DOCUMENTS

| 1,069,048 | 7/1913 | Wetherbee | 210/512.3 |
| 2,787,378 | 4/1957 | Battey | 210/512.3 |
| 2,921,646 | 1/1960 | Poole | 183/80 |

FOREIGN PATENT DOCUMENTS

| 0005494 | 11/1979 | European Pat. Off. . |
| 2256678 | 11/1972 | Fed. Rep. of Germany . |
| 961953 | 5/1950 | France . |
| 1020317 | 2/1953 | France . |
| 727137 | 3/1955 | United Kingdom ............ 210/512.3 |

Primary Examiner—Ivars Cintins
Attorney, Agent, or Firm—Sughrue, Mion, Zinn, Macpeak & Seas

[57] ABSTRACT

A separator for separating a mixture of a vapor (or as gas, or a liquid) and of a liquid (or a solid) by centrifuging the mixture inside a chamber (2) which encloses at least one cell constituted by: a central core (120); at least one circulation tube (100); a swirler device (102) for imparting swirling flow to the mixture at the inlet to the, or each, circulation tube; a collector tube (103) for collecting a less dense portion of the initial mixture, said collector tube being installed at the outlet from the, or each, circulation tube and optionally being provided with an unswirler device (104) for unswirling the flow; at least one extractor device (105) for extracting a denser portion of said mixture; at least one collector device (107) for collecting said denser portion; and reinjection means for reinjecting a part of said denser portion into the mixture to be separated or being separated; wherein the reinjection means comprise at least one extractor duct (130) connecting the collector device (107) and the central core (120) downstream from the unswirler device (104), and reinjection channels (116) made in the central core downstream from the swirler device.

12 Claims, 5 Drawing Figures

CENTRIFUGING MIXTURE SEPARATOR

The present invention relates to a separator for separating a mixture of a vapor (or a gas, or a liquid) and of a liquid (or a solid) by centrifuging the mixture inside a chamber including at least one cell, said separator being capable of being installed vertically or horizontally.

BACKGROUND OF THE INVENTION

Devices of this type are described in French patent applications Nos. 83 15289 filed Oct. 13, 1983, and 84 01474 filed Jan. 31, 1984.

These prior patent applications describe several means for reinjecting a portion of the denser material.

The object of the present invention is to provide such reinjection means suitable for improving the performance of a separator.

SUMMARY OF THE INVENTION

The present invention provides a separator for separating a mixture of a vapor (or as gas, or a liquid) and of a liquid (or a solid) by centrifuging the mixture inside a chamber which encloses at least one cell constituted by:
  a central core;
  at least one circulation tube;
  a swirler device for imparting swirling flow to the mixture at the inlet to the, or each, circulation tube;
  a collector tube for collecting a lense dense portion of the initial mixture, said collector tube being installed at the outlet from the, or each, circulation tube and optionally being provided with an unswirler device for unswirling the flow;
  at least one extractor device for extracting a denser portion of said mixture;
  at least one collector device for collecting said denser portion; and
  reinjection means for reinjecting a part of said denser portion into the mixture to be separated or being separated;
  wherein the reinjection means comprise at least one extractor duct connecting the collector device and the central core downstream from the unswirling device, and reinjection channels made in the central core downstream from the swirler device.

Advantageously, a bell encloses the collector tube in each cell for collecting the less dense portion at the extractor duct, and a cylindrical skirt encloses each cell from the extractor device up to the end of the bell.

Preferably the extractor duct is teardrop shaped in section in order to disturb the main flow leaving the unswirler device as little as possible.

In a variant, the central core comprises two portions disposed end-to-end, each including an annular bearing surface at its end adjacent to the other portion, said annular bearing surfaces being disposed one inside the other and being interconnected by fins with the reinjection channels being provided therebetween, and advantageously the diameter of the core downstream from the reinjection channels is reduced, thereby increasing the cross-section of the flow passage for the mixture in order to compensate for the increased flow of the mixture leaving the reinjection channels.

BRIEF DESCRIPTION OF THE DRAWINGS

Embodiments of the invention are described by way of example with reference to the accompanying drawings, in which.

MORE DETAILED DESCRIPTION

Figure 1:
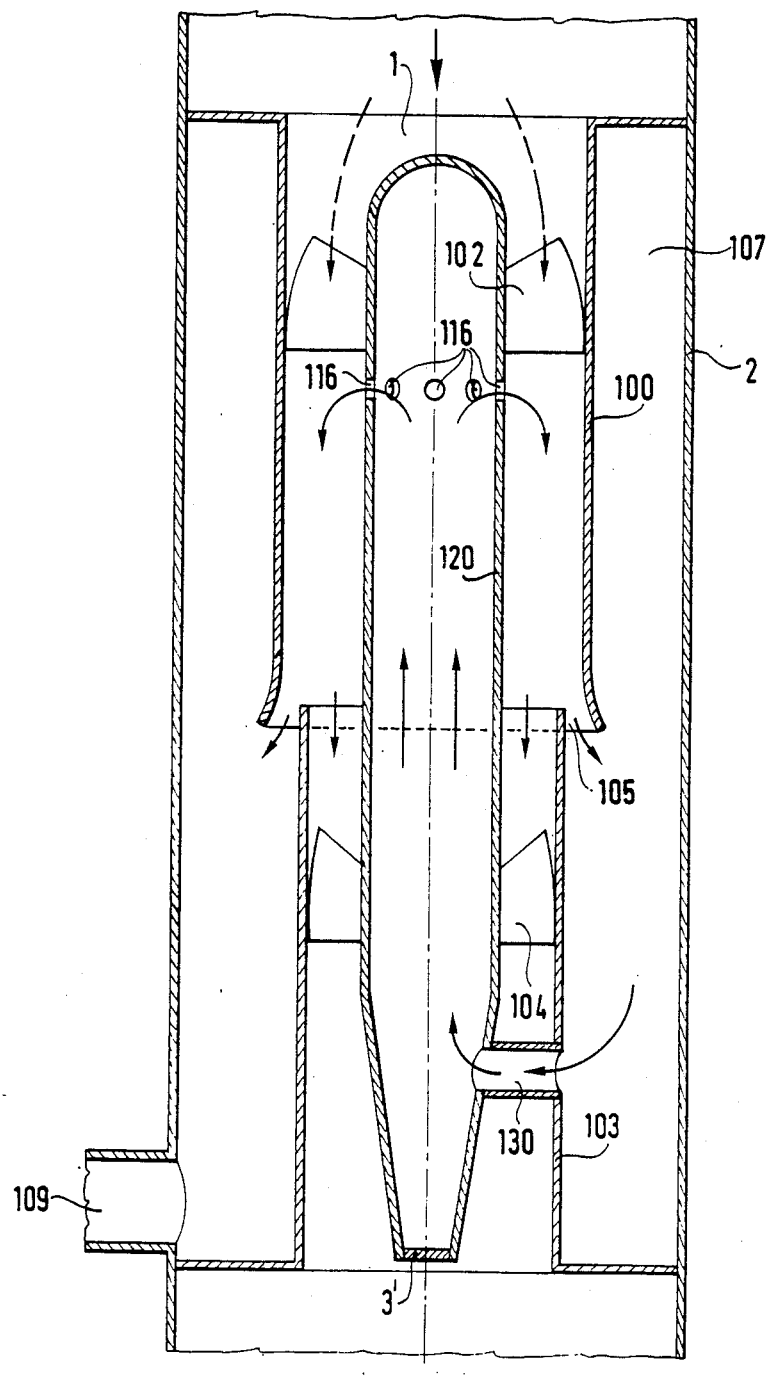
FIG. 1 shows a separator constituted by an enclosure surrounding a single cell.

FIG. 1 is an axial section through a separator for separating a mixture of water and steam (i.e. a mixture of water and water vapor). The separator is constituted by a chamber 2 enclosing a single cell. The cell is constituted by:
  a central core 120 whose bottom includes a stopper 3';
  a circulation tube 100;
  a swirler device 102 for imparting rotary motion to the mixture to be separated, said swirler device 102 being constituted by fins fixed to the central core 120;
  a collector tube 103 for collecting steam which is substantially dry, and provided with an unswirler device 104 for imparting substantially linear motion to the flow, said unswirler device 104 being constituted by fins fixed to the central core 120;
  an extractor device 105 for putting the flow into communication with a collector device or chamber 107; and
  an extractor duct 130 which connects the collector tube 103 and the core 120 in order to reinject steam and a portion of the water extracted by the extractor device 105 into the core 120. The section of this duct is teardrop shaped with the rounded end naturally being the upstream end, in order to create as little additional head loss as possible in the main flow leaving the unswirler device.

The separator is provided with an outlet pipe 109 for removing the water.

An extraction operation takes place as follows: the mixture of water and steam to be separated enters the separator via the end 1. The fins in the swirler device 102 apply a swirling motion thereto, causing the water to be centrifuged towards the circulation tube 100.

Nearly all of the water flowing along the circulation tube 100, or to be found in the vicinity of the wall of said tube, enters the extractor device 105 and is directed towards the collector chamber 107 and thence to the outlet pipe 109. The water may be caused to penetrate more easily into the extractor device 105 and it may be removed therefrom more easily by taking a fraction of steam therewith. The main flow of steam which is not extracted by the extractor device 105, together with a possible small quantity of residual water, i.e. water which is not removed by the extractor device 105, enters the collector tube 103 and encounters the unswirler device 104 which is intended to stop the swirling motion of the flow. The output of the separator thus provides a substantially axial flow of dry or nearly dry steam.

The steam and the portion of water extracted by the extractor device 105 are inserted into the core 120 via the extractor duct 130 and are reinjected into the mixture being separated via reinjection channels 116 situated downstream from the swirler device 102 and distributed around the circumference of the core.

Figure 2:
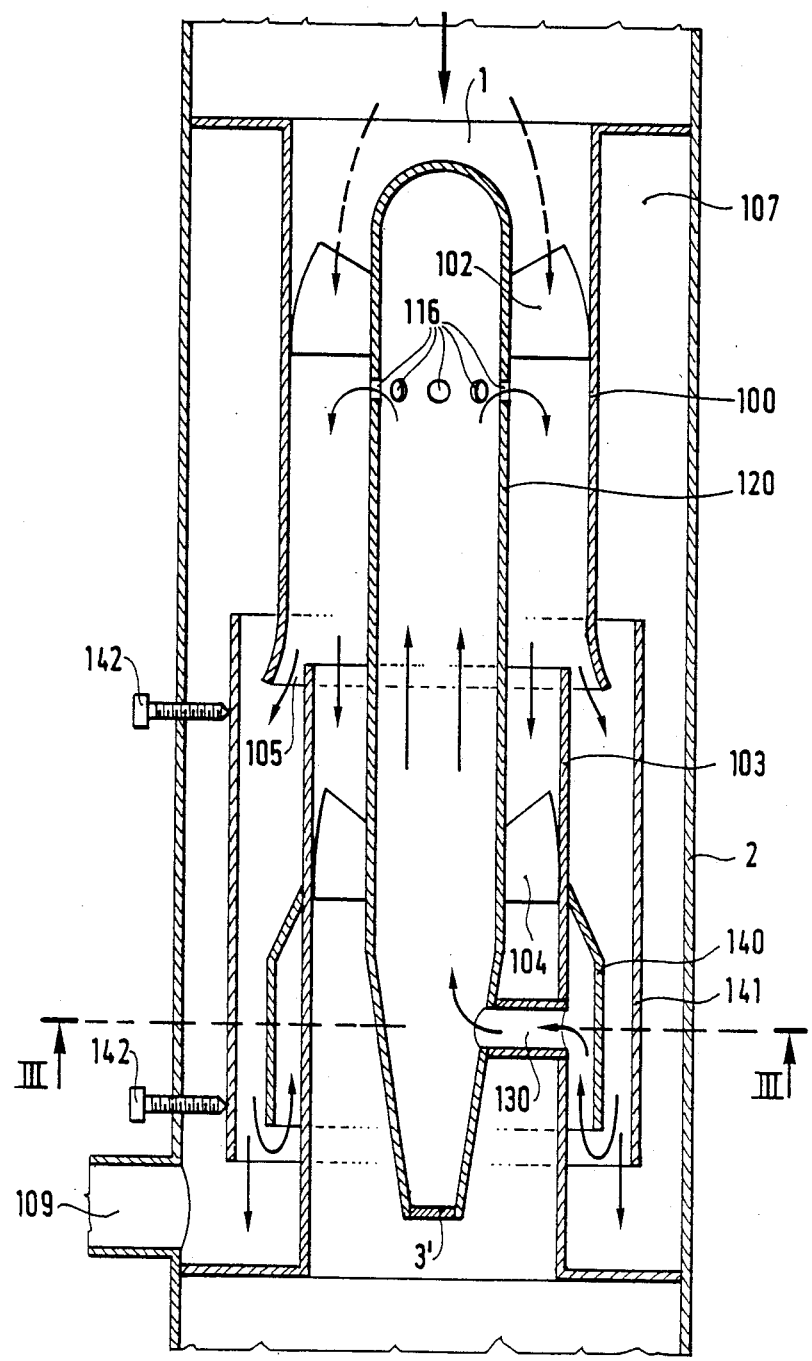
FIG. 2 shows the same cell surrounded by a cylindrical skirt, with the extraction duct being protected by a bell.

In the embodiment shown in FIG. 2, the cell is fitted with a bell 140 which is fixed to the collector tube 103, e.g. by welding, so that the bell surrounds the entire periphery of the collector tube level with the extractor duct 130 so as to avoid drowning the duct. When the separator includes a plurality of cells, only one of which is shown in the figure, each cell is enclosed by a cylindrical skirt 141 so as to separate the cells from one another. The skirt is held in place by circumferentially distributed screws 142, and preferably by screws at 120° intervals.

Figure 3:
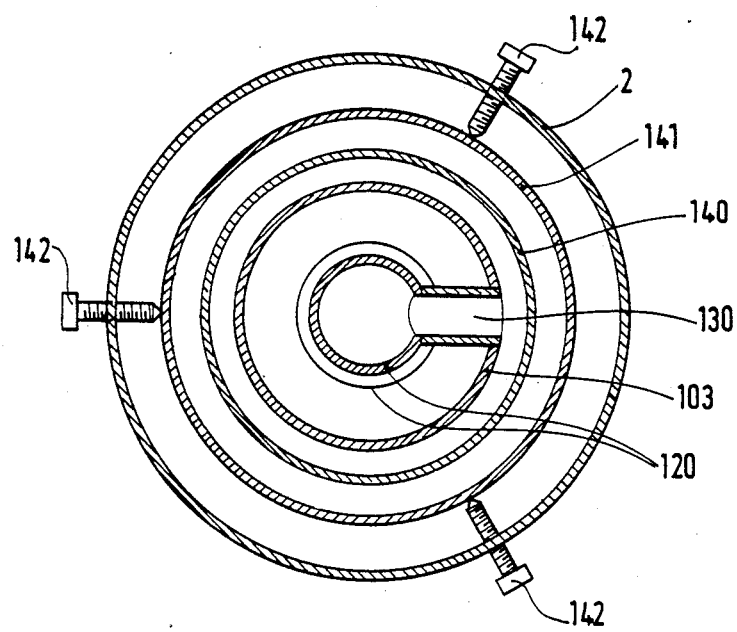
FIG. 3 is a section on line III of FIG. 2.

FIG. 3 is a cross-section through the separator on a line III—III in FIG. 2. For reasons of clarity, the unswirler device 104 has been omitted from this figure. Working from the center outwardly, there can be seen the central core 120, the extractor duct 130, the collector tube 103, the bell 140, the skirt 141, the skirt-fixing means 142, and the chamber 2. The skirt-fixing means comprise six screws 142 occupying two different planes and disposed at 120° intervals in each of said planes. If the separator is disposed horizontally, the skirt 141 may be fitted with holes opposite the outlet pipe 102. These holes serve to remove the liquid which accumulates in the bottom part of the skirt.

Figure 4:
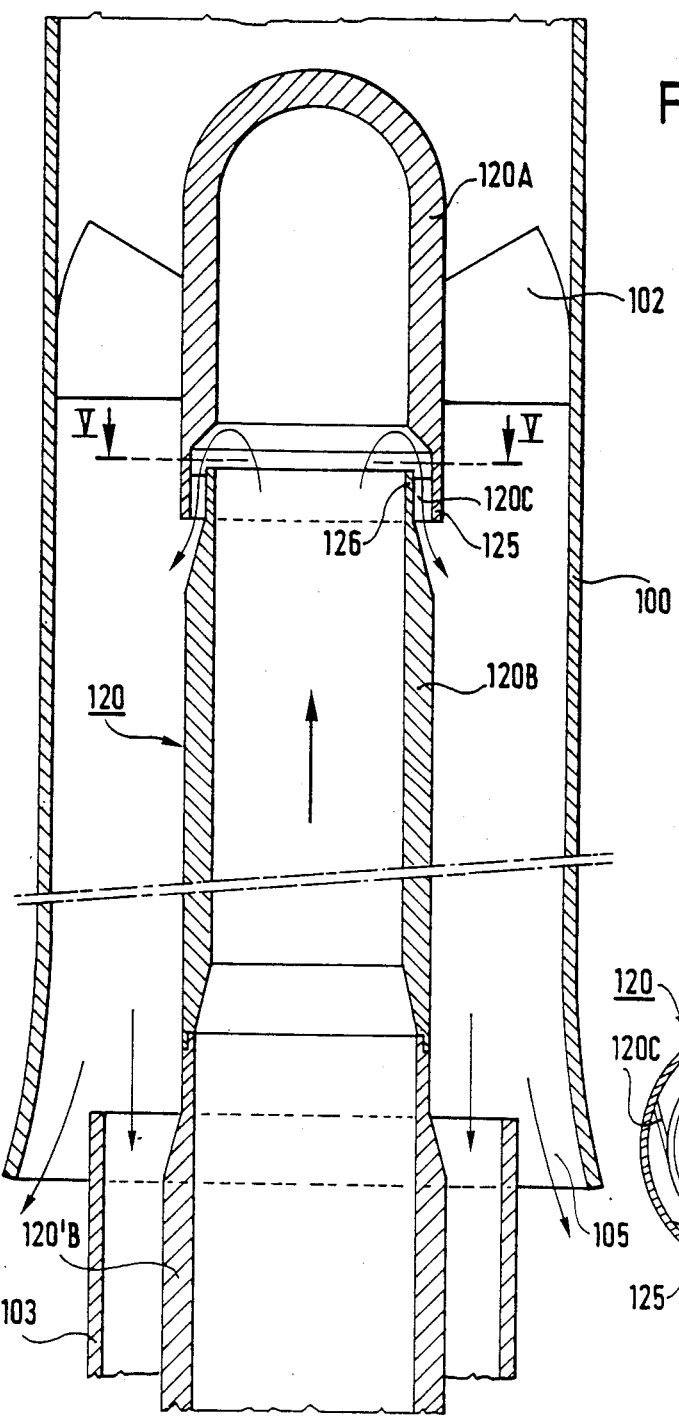
FIG. 4 shows a variant central core.

FIG. 4 shows a variant of the central core made up from a plurality of parts and including different reinjection channels.

FIG. 4 shows a central core 120, a circulation tube 100, and a swirling device 102 fixed to the core 120 and to the circulation tube 100. The core 120 is constituted by three parts 120A, 120B, and 120'B, and the parts 120B and 120'B could naturally be constituted by a single part.

Figure 5:
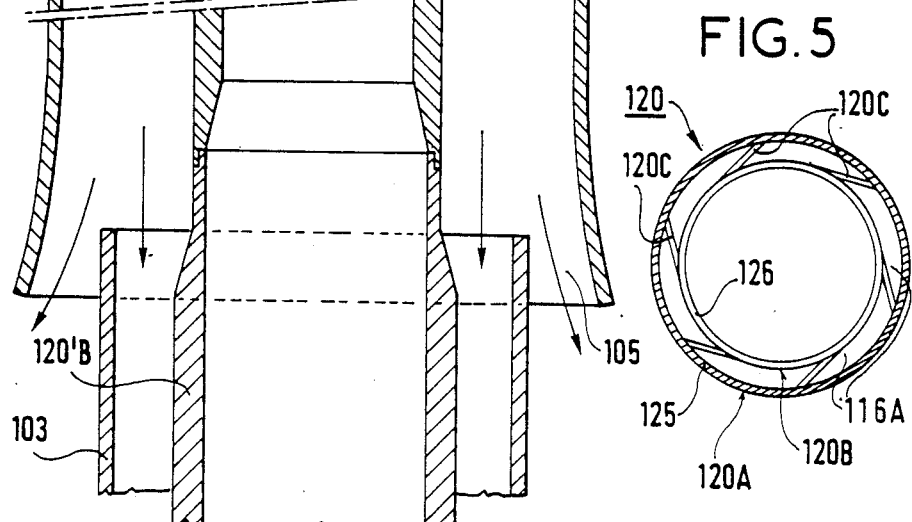
FIG. 5 is a section through said variant on a line V—V of FIG. 4.

One end of the part 120A has an outer annular bearing surface 125 and one end of the part 120B has an inner annular bearing surface 126. Fins 120C are disposed between these two bearing surfaces 125 and 126 (see FIG. 5) and are welded at an angle relative to a radial plane so as to impart a swirling motion to the reinjected mixture of steam and water so that it turns in the same direction as the mixture leaving the swirling device 102. The reinjection channels 116A can also be seen in FIG. 5.

The middle 120B and the end of the part 120'B are of smaller outside diameter than the part 120A in order to compensate for the increased flowrate.

Naturally, the outside diameter of the part 120'B returns to the outside diameter of the part 120A at about the level of the inlet to the collector tube 103.

We claim:

1. A separator for separating a mixture of a vapor, gas or liquid and of a second liquid or a solid by centrifuging a mixture thereof inside a chamber which encloses at least one cell constituted by:
    a central core;
    at least one circulation tube surrounding said core;
    a swirler device for imparting swirling flow to the mixture at the inlet to said at least one circulation tube;
    a collector tube surrounding said central core, said collector tube being installed at the outlet from said at least one circulation tube for collecting a less dense portion of the initial mixture;
    at least one extractor device for extracting a denser portion of said mixture;
    at least one collector device for collecting said denser portion; and
    reinjection means for reinjecting a part of said denser portion into the mixture to be separated or being separated;
    the improvement wherein the reinjection means comprises at least one extractor duct connecting said at least one collector device and the central core, and reinjection channels in the central core opening to said circulation tube downstream from the swirler device.

2. A separator according to claim 1, wherein said at least one cell includes a bell surrounding the collector tube for collecting the less dense portion of the mixture level with the extractor duct.

3. A separator according to claim 2, wherein a cylindrical skirt surrounds said at least one cell from the extractor device to the end of the bell.

4. A separator according to claim 1, wherein the extractor duct is of teardrop shaped section with a rounded upstream end in order to disturb the main flow leaving the unswirler device as little as possible.

5. A separator according to claim 1, wherein the central core comprises two cylindrical parts disposed coaxially end-to-end, each of said parts includes an annular bearing surface at its end proximate to the other part, said annular bearing surfaces being disposed concentrically one inside the other and radially spaced from each and fins interconnecting said parts at said annular bearing surfaces and forming said reinjection channels provided between said parts at said annular bearing surfaces.

6. A separator according to claim 5, wherein the diameter of the core part downstream from the reinjection channels is reduced to increase the cross-section of the flow passage defined by said reinjection channels for the mixture in order to compensate for the increased flowrate due to the added mixture leaving via the reinjection channels.

7. A separator for separating a mixture of a vapor, gas, or a liquid and of a second liquid or a solid by centrifuging a mixture thereof inside a chamber which encloses at least one cell constituted by;
    a central core;
    at least one circulation tube surrounding said core;
    a swirler device for imparting swirling flow to the mixture at the inlet to said at least one circulation tube;
    a collector tube surrounding said central core, said collector tube being installed at the outlet from said at least one circulation tube for collecting a less dense portion of the initial mixture, an unswirler device mounted to the inlet of said collector tube for unswirling the mixture flow;
    at least one extractor device for extracting a denser portion of said mixture;
    at least one collector device for collecting said denser portion; and
    reinjection means for reinjecting a part of said denser portion into the mixture to be separated or being separated;
    the improvement wherein the reinjection means comprises at least one extractor duct connecting the collector device and the central core downstream from the unswirler device, and reinjection channels in the central core opening to said circulation tube downstream from the swirler device.

8. A separator according to claim 7, wherein at least one cell includes a bell surrounding the collector tube for collecting the less dense portion of the mixture level with the extractor duct.

9. A separator according to claim 8, wherein a cylindrical skirt surrounds at least one cell from the extractor device to the end of the bell.

10. A separator according to claim 7, wherein the extractor duct is of teardrop shaped section with a rounded upstream end in order to disturb the main flow leaving the unswirler device as little as possible.

11. A separator according to claim 7, wherein the central core comprises two coaxial, end-to-end cylindrical parts, each of said parts includes an annular bearing surface at the end thereof proximate to the other part, said annular bearing surfaces being concentrically disposed, one inside the other and radially separated from each other, and fins interconnecting said annular bearing surfaces and defining said reinjection channels therebetween.

12. A separator according to claim 11, wherein the diameter of the core part downstream from the reinjection channels is reduced to increase the cross-section of the flow passage defined by said reinjection channels for the mixture in order to compensate for the increased flowrate due to the added mixture leaving via the reinjection channels.

* * * * *